United States Patent
Modhvadia et al.

(10) Patent No.: US 12,205,405 B2
(45) Date of Patent: Jan. 21, 2025

(54) INMATE RELEASE VERIFICATION

(71) Applicant: Codex Corporation, Maple Grove, MN (US)

(72) Inventors: Adit Modhvadia, Maple Grove, MN (US); Benjamin Drong, Otsego, MN (US); Adithi Deborah Chakravarthy, Omaha, NE (US); Andrew Shaw, Eagan, MN (US); Gareth Miller, Roseville, MN (US); Kenneth L. Dalley, Jr., Maple Grove, MN (US)

(73) Assignee: Codex Corporation, Maple Grove, MN (US)

( * ) Notice: Subject to any disclaimer, the term of this patent is extended or adjusted under 35 U.S.C. 154(b) by 341 days.

(21) Appl. No.: 17/722,976

(22) Filed: Apr. 18, 2022

(65) Prior Publication Data
US 2023/0334908 A1 Oct. 19, 2023

(51) Int. Cl.
*G06V 40/16* (2022.01)
*G07C 9/24* (2020.01)
*G07C 9/28* (2020.01)

(52) U.S. Cl.
CPC .......... *G06V 40/179* (2022.01); *G06V 40/166* (2022.01); *G06V 40/168* (2022.01); *G07C 9/243* (2020.01); *G07C 9/28* (2020.01)

(58) Field of Classification Search
CPC .. G06V 40/179; G06V 40/168; G06V 40/166; G06V 40/172; G07C 9/28; G07C 9/243; G07C 9/25
See application file for complete search history.

(56) References Cited

U.S. PATENT DOCUMENTS

| | | | |
|---|---|---|---|
| 7,013,365 B2 * | 3/2006 | Arnouse | G06Q 20/341 711/115 |
| 2017/0344810 A1 * | 11/2017 | Askari | G06F 16/51 |
| 2018/0158165 A1 * | 6/2018 | Hodge | G06F 16/583 |
| 2019/0326013 A1 * | 10/2019 | Rashidi | G16H 40/63 |
| 2019/0340346 A1 * | 11/2019 | Gibbs | G06Q 10/0639 |
| 2020/0195636 A1 * | 6/2020 | Landrock | H04L 63/0861 |
| 2021/0295962 A1 * | 9/2021 | Bloom | G06Q 10/1095 |

\* cited by examiner

*Primary Examiner* — Pinalben Patel
(74) *Attorney, Agent, or Firm* — Schwegman Lundberg & Woessner, P.A.

(57) ABSTRACT

Some embodiments process facial images to ensure the inmate present for release is the actual inmate to be released. One embodiment includes receiving a facial image and a data identifier of a person. This embodiment further includes processing the facial image of the person in view of facial image data of the person to determine whether the received facial image matches the retrieved facial image data. The facial image data may be retrieved based on the data identifier of the person, facial landmark data extracted from the facial image, or otherwise. When the received facial image and the retrieved facial image data of the person match, an indicator of a match and a successful release identity verification is output. When there is not a match, an indicator of a failed release identity verification is output.

20 Claims, 4 Drawing Sheets

INMATE RELEASE VERIFICATION

BACKGROUND

Jail and prison inmates often challenge corrections officers. These challenges can present risks to corrections officers and the public as a whole. Being deceived by one of these challenges is unacceptable for compliance with the law and for ensuring justice is served and public safety is maintained. One such challenge is presented at the time of inmate release. Corrections officers ensure the inmate being processed for released is actually the person to be released. Errors releasing inmates, while not common, do occur with a degree of frequency. A simple Internet search for "wrong inmate released" reveals many such stories. There are many reasons why this has occurred, some due to inmate deception, others due to record keeping errors. Regardless, of the cause, the result is the same, the wrong inmate being released.

SUMMARY

Various embodiments herein provide solutions to minimize and possibly even eliminate jail and prison errors in releasing the wrong inmate. Some such embodiments utilize facial image verification to ensure the inmate present for release is the actual inmate to be released. In some aspects, the techniques described herein relate to a method including: receiving a facial image and a data identifier of a person; retrieving, from an inmate database based on the data identifier of the person, a release date of the person; processing the facial image of the person in view of facial image data of the person to determine whether the received facial image matches the retrieved facial image data of the person, the facial image data retrieved based on the data identifier of the person; when the received facial image and the retrieved facial image data of the person match and the release date of the person is equal to or earlier than a current moment, outputting an indicator of a match and a successful release identity verification; and when the received facial image and the retrieved facial image data of the person do not match, outputting an indicator of a failed release identity verification due to a failed match.

In some aspects, the techniques described herein relate to a computer-readable medium, with instructions stored thereon, which when executed by a computer processor cause a computing device to perform data processing actions including: receiving a facial image and a data identifier of a person; processing the facial image of the person in view of facial image data of the person to determine whether the received facial image matches the retrieved facial image data of the person, the facial image data retrieved based on the data identifier of the person; when the received facial image and the retrieved facial image data of the person do not match, outputting an indicator of a failed release identity verification due to a failed match; and when the received facial image and the retrieved facial image data of the person match, outputting an indicator of a match and a successful release identity verification.

In some aspects, the techniques described herein relate to a handheld computing device including: a computer processor; a digital camera; a memory storing instructions executable by the computer processor to perform data processing activities including: receiving a facial image from the digital camera; receiving an input of a data identifier of a person; processing the received facial image to identify at least one facial landmark therein; retrieving a first set of person identifying data based on the identified facial landmarks and a second set of person identifying data based on the data identifier of the person; when the first and second sets of person identifying data do not match, outputting an indicator of a failed release identity verification due to a failed match; and when the first and second sets of person identifying data match, outputting an indicator of a match and a successful release identity verification.

DETAILED DESCRIPTION

Embodiments herein relate to inmate release verification to address issues related to releasing of the wrong inmate from a jail, prison, or other detainment facility or premises. Such embodiments utilize a datastore, such as a database, that stores information related to inmates. This information typically includes, for each inmate, at least an identifier of the inmate and a facial image, or facial landmark data derived from a facial image, of the inmate. Subsequently when an inmate is to be released, the stored data is utilized to ensure the inmate presented for release matches the stored facial data of the inmate presented. Some embodiments may include further verification, such as one or both of an additional query for a stored release date in view of a current date and a query of one or more other databases for detainer requests and outstanding arrest warrants for the inmate to be released from other agencies and jurisdictions. Some other embodiments may also include additional verification either by default, upon a failed verification, or upon a verification that is not fully conclusive. Such additional verification may include another type of biometric comparison such as fingerprints or retina, personal verification or validation by one or more additional corrections officers, and other verification techniques depending on policies and procedures defined by a particular implementing entity.

These and other embodiments are described in further detail with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
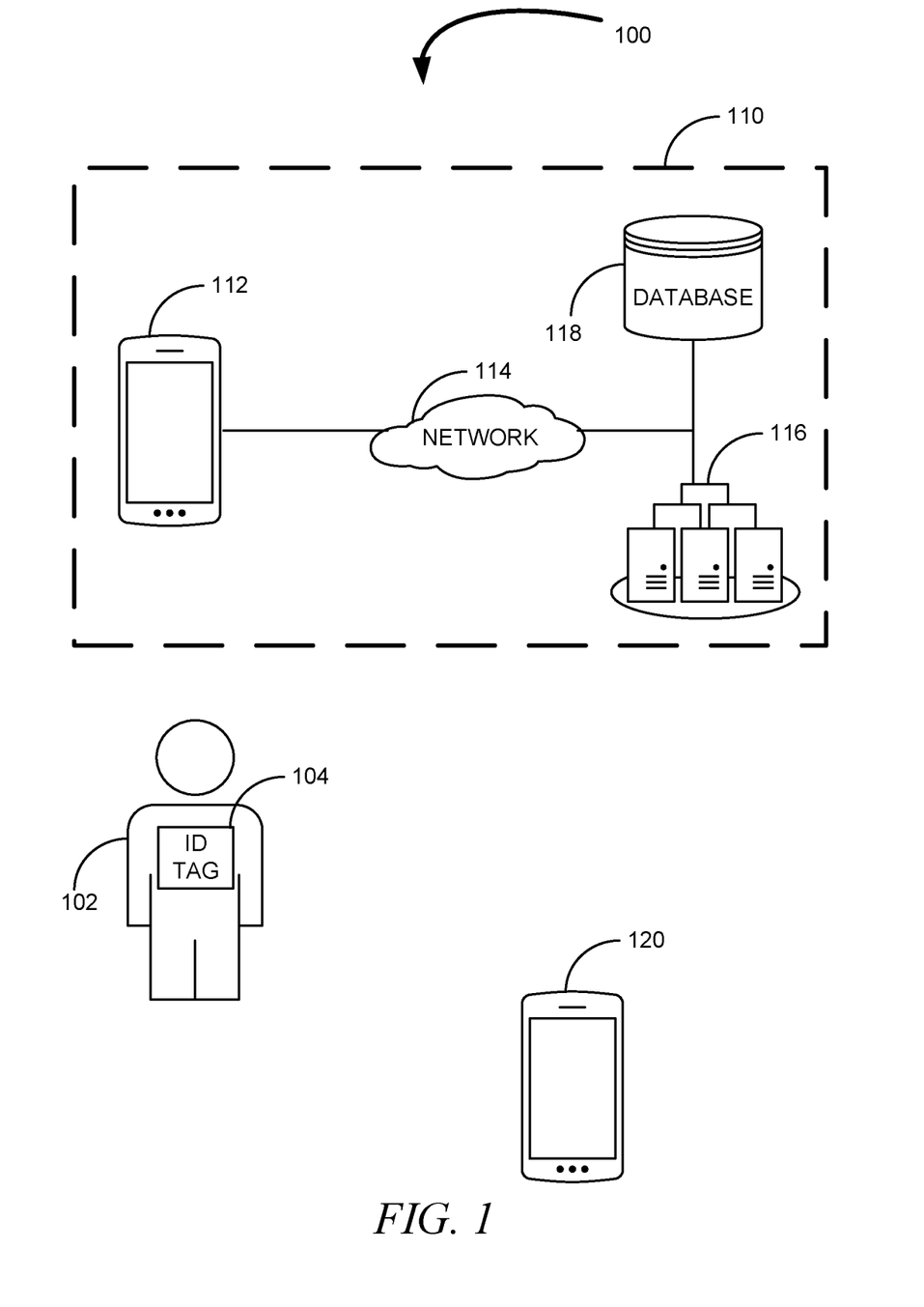
FIG. 1 is a logical block diagram of systems according to two example embodiments.

FIG. 1 is a logical block diagram 100 of systems 110, 120 according to two example embodiments. The two systems 110, 120 of FIG. 1 are deployed for inmate release verification to ensure an inmate 102 present for release processing is in fact the inmate to be released. The system 110 is an example embodiment that relies upon data processing performed remotely from a computing device 112 utilized at a location of the inmate 102 to be released. The system 120 is an example embodiment that relies upon data processing performed on a computing device of the system 120 utilized at a location of the inmate 102 to be released. In either system 110, 120 embodiment, the respective computing devices may be handheld computing devices, tablets, smartphones, personal computers, laptop computers, and the like.

The system 110 includes the computing device 112 that connects to a network 114. Also connected to the network 114 are computing resources including servers 116, such as application servers, and a database 118. The network may the Internet, but it may also be or include a secure local or wide area network. In some embodiments, the network 114 is a secure network without any external connections, while in other embodiments the network 114 may be more open and data carried thereon is secured through encryption.

The servers 116 may be hosted application servers provided by a company such as IBM or Amazon Web Services (AWS). In other embodiments, the servers may be application servers operated on the network by an entity operating a detention facility or a system of detention facilities. The servers 116 execute software that perform various processes of matching an image captured by a camera of the computing device 112 with images associated with inmate 102 identity data stored in the database 118. Such matching may be performed in various ways in different embodiments.

For example, the database 118 may store one or more records for each inmate 102 with data including an identifier and facial image data of the inmate 102. The identifier may be a unique number or other data that associated with a radio frequency identification (RFID) tag or barcode worn by an inmate 102. The facial image data may be one or more of facial images and data derived from facial images such as data representations of facial landmarks and relations therebetween. Facial landmarks are generally facial features such as mouth, eyes, eyebrows, nose, jawline, and the like. Facial landmark data may include locations of landmarks identified within a facial image and other data with regard to shapes and sizes thereof and spatial relations therebetween.

Subsequently, an image maybe captured by a camera of the computing device 112 of an inmate 102 to be released. That image may then be submitted over the network 114 to a process that executes on one or more of the servers 116. The image may be processed utilizing additional processes that may be available within the server 116 computing environment. For example, some embodiments deployed on servers 116 hosted by AWS may utilize the Amazon Rekognition facial recognition data processing services. In this embodiment, the image may be processed to obtain facial landmark data. Some of this facial landmark data may then be utilized to query the database 118 to retrieve inmate identity records. In some embodiments, the retrieval may be made utilizing a nearest neighbor type of match or other scoring algorithm that identifies similarity of facial landmark data for a number of facial landmarks and sums or performs additional processing to identify a most likely match.

In some embodiments, the processing may further include the computing device 112 receiving input of an inmate 102 identifier 104 and submitting the inmate 102 identifier 104 with the image to the servers. In such embodiments, once the image processing has identified a likely match, the identifier is utilized to retrieve an associated inmate record. The image match is confirmed when the inmate records retrieved with the identifier and the image processing are the same record.

In such embodiments, the identifier may be obtained as input by reading an RFID tag worn on a wristband, within clothing, embedded within an identification card, and the like. In such RFID embodiments, the computing device 112 may have an RFID reader included therein or otherwise in communication therewith. In other embodiments, a camera of the computing device 112 may be utilized to read a barcode, which may be a one or two-dimensional barcode, worn or carried by the inmate 102. In further embodiments, the identifier may be simply input by the inmate 102 or a corrections officer via a touchscreen, keyboard/keypad, or other input device.

In these embodiments, a result of the matching may then be returned from the servers 116 to the computing device 112. However, some embodiments may include further processing. For example, when retrieving inmate data based on one or both of the inmate identifier and the facial image data, a release date may be retrieved. The release date may then be considered in view of the present date to verify the release date of the inmate 102 allows for release. Additionally, when the inmate 102 identity has been confirmed, various elements of the inmate 102 identity data may then be used to query additional databases to find any outstanding warrants and detainer requests from other local, state, and federal law enforcement agencies. Results of such additional processing may then be returned to the computing device 112.

In the system 120 embodiments, the processing is effectively the same, but rather than sending data over the network 114, the data collection and retrieval is performed locally on the device of the system 120. A database is stored in memory and the facial landmark identification and matching processing are performed on the device of the system 120. The system 120 can therefore operate in environments where network access is not available.

Figure 2:
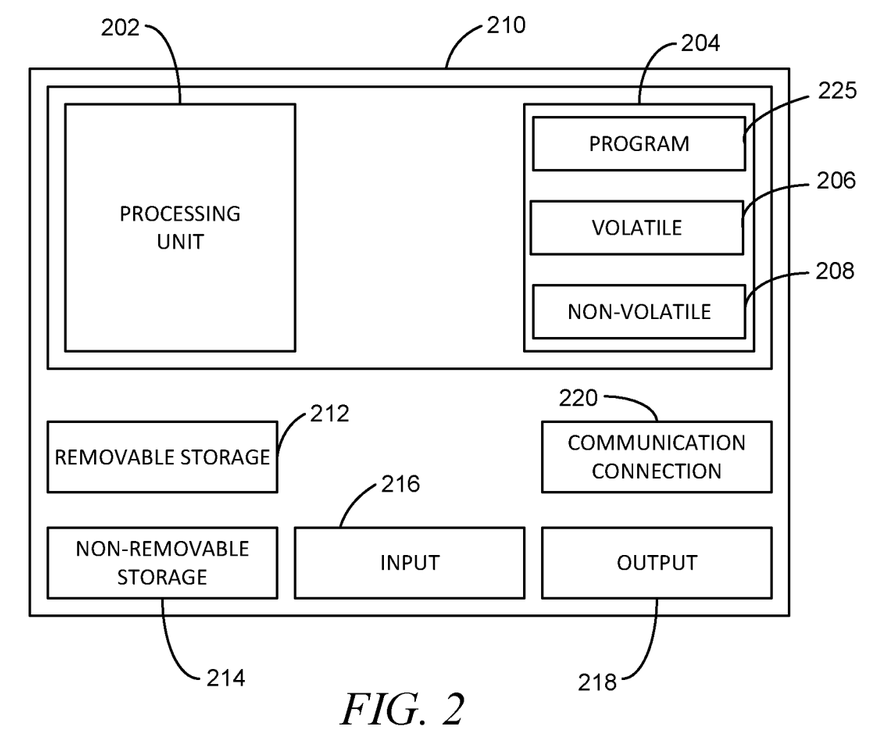
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210, may include a processing unit 202, memory 204, removable storage 212, and non-removable storage 214. Although the example computing device is illustrated and described as computer 210, the computing device may be in different forms in different embodiments. For example, the computing device may instead be a handheld device, smartphone, a tablet, smartwatch, or other computing device including the same or similar elements as illustrated and described with regard to FIG. 2. Devices such as handheld devices, smartphones, tablets, and smartwatches maybe generally and collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, an RFID reading/scanning device, Near Field Communication (NFC) device, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices. For example, the communication connection 220 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

Figure 3:
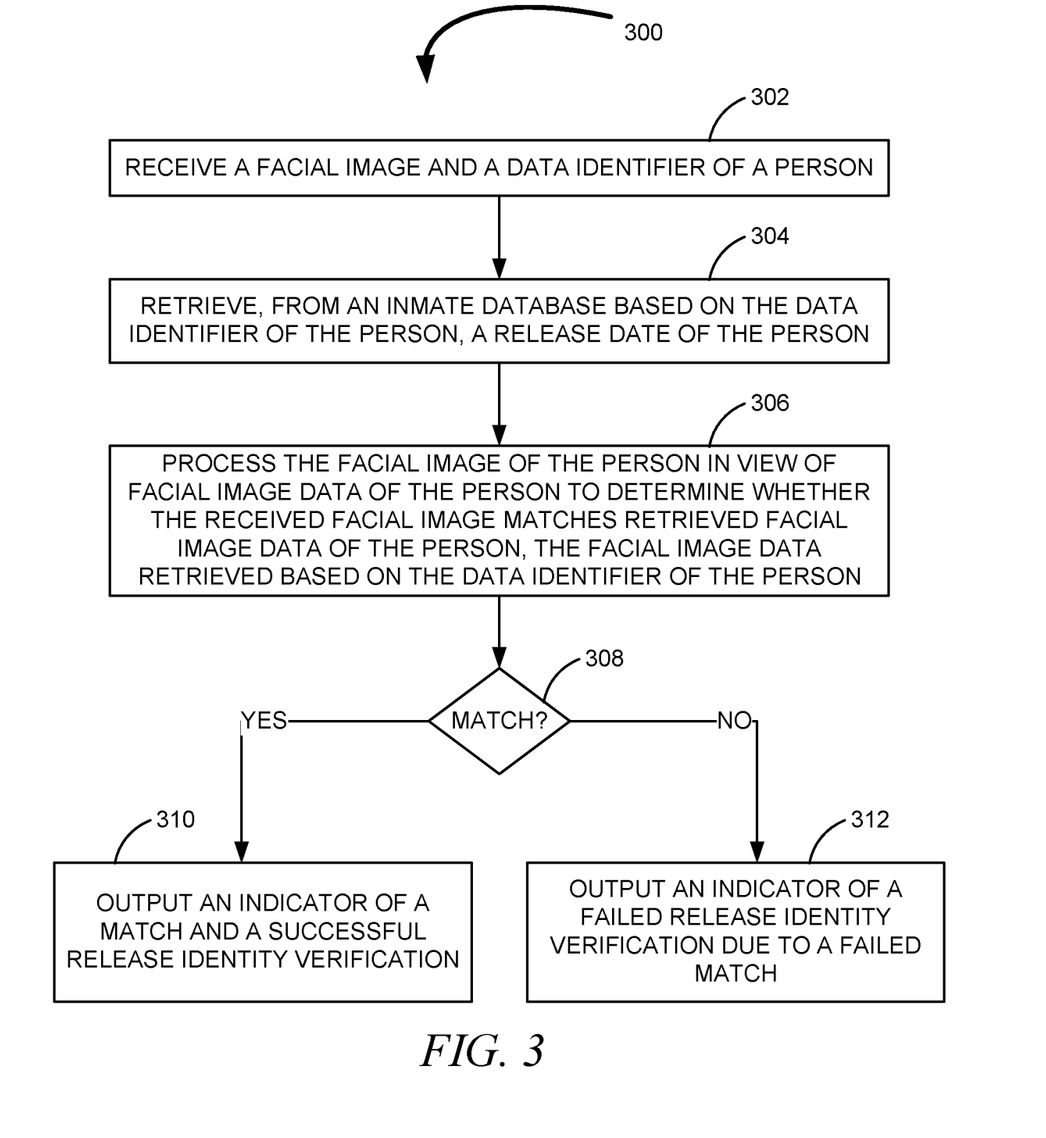
FIG. 3 is a block flow diagram of a method, according to an example embodiment.

FIG. 3 is a block flow diagram of a method 300, according to an example embodiment. The method 300 is an example of a method that may be performed on one or more servers 116 of FIG. 1 or on a device of the system 120 of FIG. 1.

The method 300 includes receiving 302 a facial image and a data identifier of a person. The method 300 further includes retrieving 304, from an inmate database based on the data identifier of the person, a release date of the person. Subsequently, the method 300 processes 306 the facial image of the person in view of facial image data of the person to determine whether the received facial image matches the retrieved facial image data. In such embodiments. the facial image data may be retrieved based on the data identifier of the person. In some other embodiments, the facial image data may be retrieved based on facial landmark data derived from the received 302 image.

The method 300 then continues by determining 308 whether the received facial image and the retrieved facial image data match. In some such embodiments, the method 300 may further include retrieving a release date with the retrieved facial image data such that the determining further includes consideration of whether the release date is at least equal to the present date. When the received facial image and the retrieved facial image data of the person match and the release date of the person is equal to or earlier than a current moment, the method 300 may proceed by outputting 310 an indicator of a match and a successful release identity verification. However, when the received facial image and the retrieved facial image data of the person do not match the method 300 may instead proceed by outputting 312 an indicator of a failed release identity verification due to a failed match.

In some embodiments of the method 300, the data identifier of the person is a data item read from an RFID tag, barcode, or other device-readable data element possessed or worn by the person.

In another embodiment of the method 300, the processing 306 of the facial image of the person in view of stored facial image data includes processing the facial image identify facial landmarks therein and retrieving the stored facial image data including facial landmark data. This embodiment may then compare the identified facial landmarks to the facial landmark data to obtain a matching score and when the matching score meets criteria for declaring a match, outputting the indicator of a match. However, when the matching score does not meet criteria for declaring a match, the method 300 of this embodiment includes outputting an indicator of a failed match.

In some embodiment, release identity verification includes matching facial image data with stored facial image data retrieved based on the data identifier of the person. A further matching may also be performed matching a release date of the person being equal to or earlier than a current moment and verifying an operator of a system performing the method is authorized to release the person. Release identity verification in some embodiments may further include retrieving data of the person from at least one external database for any outstanding warrants or other detainer requests, the retrieving performed based on one or more of facial image data, stored biometric data of the person, and other personally identifying data of the person.

In some embodiments, the processing 306 of the facial image of the person in view of stored facial image data includes extracting facial features from the facial image. The method 300 in such embodiments further includes retrieving a first identity from an inmate database based on the extracted facial features and retrieving a second identity from the inmate database based on the data identifier of the person. When the first and second identities are the same identity, the method 300 includes outputting the indicator of a match and when the first and second identities are not the same identity, an indicator of a failed match is instead output.

Figure 4:
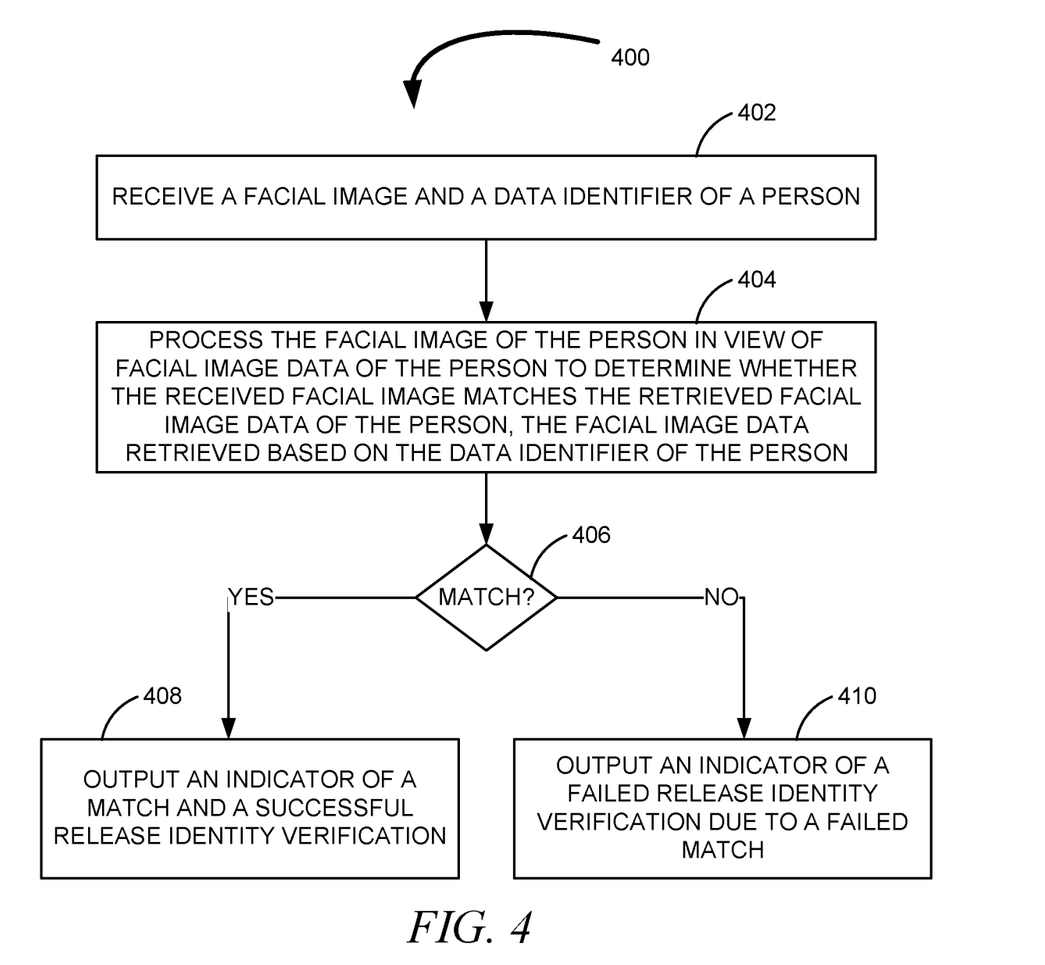
FIG. 4 is a block flow diagram of a method, according to an example embodiment.

FIG. 4 is a block flow diagram of a method, according to an example embodiment. The method 400 is another example of a method that may be performed on one or more servers 116 of FIG. 1 or on a device of the system 120 of FIG. 1.

The method 400 includes receiving 402 a facial image and a data identifier of a person and processing 404 the facial image of the person in view of facial image data of the person to determine whether the received facial image matches the retrieved facial image data. In some such embodiments, the facial image data is retrieved based on the data identifier of the person. The method 400 then continues by determining 406 whether the received facial image and the retrieved facial image data match. When there is not match, the method 400 output 410 an indicator of a failed release identity verification due to a failed match. When the determining 406 does identify a match, the method 400 includes outputting 408 an indicator of a match and a successful release identity verification.

Another embodiment is in the form of a computing device, such as a handheld computing device, other type of mobile device, personal or laptop computer and the like. The devices of such embodiments include a computer processor, a digital camera, and a memory storing instructions executable by the computer processor to perform data processing activities. The data processing activities, in some embodiments, include receiving a facial image from the digital camera and receiving an input of a data identifier of a person. The data processing activities further include processing the received facial image to identify at least one facial landmark therein and retrieving a first set of person identifying data based on the identified facial landmarks and a second set of person identifying data based on the data identifier of the person. Subsequently, when the first and second sets of person identifying data do not match, the data processing activities include outputting an indicator of a failed release identity verification due to a failed match. On the other hand, when the first and second sets of person identifying data match, the data processing activities include outputting an indicator of a match and a successful release identity verification.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method for inmate release verification, the method comprising:
    generating, by a camera, a facial image of a person that is to be released from a detention facility;
    retrieving, by a barcode worn by the person or a radio frequency identifier (RFID) tag worn by the person, a data identifier that uniquely identifies the person;
    retrieving, from an inmate database based on the data identifier of the person, a release date of the person from the detention facility;
    processing the facial image of the person in view of facial image data of the person to determine whether the facial image matches the facial image data, the facial image data retrieved based on the data identifier of the person;
    when the received facial image and the retrieved facial image data of the person match and the release date of the person is equal to or earlier than a current moment, outputting an indicator of a match and a successful release identity verification indicating that the person is to be released from the detention facility; and
    when the received facial image and the retrieved facial image data of the person do not match, outputting an indicator of a failed release identity verification due to a failed match, the failed release identity verification indicating that the person is not to be released from the detention facility.

2. The method of claim 1, wherein the data identifier of the person is a data item read from a radio frequency identifier (RFID) tag possessed or worn by the person.

3. The method of claim 1, wherein processing the facial image of the person in view of stored facial image data includes:
    processing the facial image to identify facial landmarks therein;
    retrieving the stored facial image data including facial landmark data;
    comparing identified facial landmarks to the facial landmark data to obtain a matching score;
    when the matching score meets criteria for declaring a match, outputting the indicator of a match; and
    when the matching score does not meet criteria for declaring a match, outputting an indicator of a failed match.

4. The method of claim 1, wherein release identity verification includes:
    matching facial image data with stored facial image data retrieved based on the data identifier of the person;
    matching a release date of the person being equal to or earlier than a current moment; and
    verifying an operator of a system performing the method is authorized to release the person.

5. The method of claim 4, wherein release identity verification further includes:
    retrieving data of the person from at least one external database for any outstanding warrants or other detainer requests, the retrieving performed based on one or more of facial image data, stored biometric data of the person, and other personally identifying data of the person.

6. The method of claim 1, wherein processing the facial image of the person in view of stored facial image data of the person includes:
    extracting facial features from the facial image;
    retrieving a first identity from an inmate database based on the extracted facial features;
    retrieving a second identity from the inmate database based on the data identifier of the person;
    when the first and second identities are a same identity, outputting the indicator of a match; and when the first and second identities are not a same identity, outputting an indicator of a failed match.

7. The method of claim 1, wherein the method is performed locally on computing resources of a handheld device including an imaging device from which the image is received, a radio frequency identification (RFID) tag reading device from which the data identifier is received, a computer processor on which the processing is performed, and a database from which the facial image data is retrieved and within which the inmate database is stored.

8. A non-transitory computer-readable medium, with instructions stored thereon, which when executed by a computer processor cause a computing device to perform data processing actions for inmate release verification, the data processing actions comprising:
generating a facial image of a person that is to be released from a detention facility;
retrieving, by a barcode worn by the person or a radio frequency identifier (RFID) tag worn by the person, a data identifier that uniquely identifies the person;
retrieving, from an inmate database based on the data identifier of the person, a release date of the person from the detention facility;
processing the facial image of the person in view of facial image data of the person to determine whether the facial image matches the facial image data of the person, the facial image data retrieved based on the data identifier of the person;
when the received facial image and the retrieved facial image data of the person do not match, outputting an indicator of a failed release identity verification due to a failed match, the failed release identity verification indicating that the person is not to be released from the detention facility; and
when the received facial image and the retrieved facial image data of the person match, outputting an indicator of a match and a successful release identity verification indicating that the person is to be released from the detention facility.

9. The non-transitory computer-readable medium of claim 8, wherein the data identifier of the person is a data item read from a radio frequency identifier possessed or worn by the person.

10. The non-transitory computer-readable medium of claim 8, wherein processing the facial image of the person in view of stored facial image data of the person includes:
processing the facial image identify facial landmarks therein;
retrieving the stored facial image data including facial landmark data;
comparing the identified facial landmarks to the facial landmark data to obtain a matching score;
when the matching score meets criteria for declaring a match, outputting the indicator of a match; and
when the matching score does not meet criteria for declaring a match, outputting an indicator of a failed match.

11. The non-transitory computer-readable medium of claim 8, wherein release identity verification includes:
matching facial image data with stored facial image data retrieved based on the data identifier of the person;
matching a release date of the person being equal to or earlier than a current moment; and
verifying an operator of a system performing is authorized to release the person.

12. The non-transitory computer-readable medium of claim 8, wherein release identity verification further includes:
retrieving data of the person from at least one external database for any outstanding warrants or other detainer requests, the retrieving performed based on one or more of facial image data, stored biometric data of the person, and other personally identifying data of the person.

13. The non-transitory computer-readable medium of claim 8, wherein processing the facial image of the person in view of stored facial image data of the person includes:
extracting facial features from the facial image;
retrieving a first identity from an inmate database based on the extracted facial features;
retrieving a second identity from the inmate database based on the data identifier of the person;
when the first and second identities are a same identity, outputting the indicator of a match; and
when the first and second identities are not a same identity, outputting an indicator of a failed match.

14. The non-transitory computer-readable medium of claim 8, wherein the data processing actions are performed locally on computing resources of a handheld device including an imaging device from which the image is received, a radio frequency identification (RFID) tag reading device from which the data identifier is received, the computer processor on which the processing is performed, and a database from which the facial image data is retrieved and within which an inmate database is stored.

15. A computing device comprising:
a computer processor;
a digital camera; and
a memory storing instructions executable by the computer processor to perform data processing activities comprising:
receiving a facial image from the digital camera;
receiving, by a barcode worn by a person or a radio frequency identifier (RFID) tag worn by the person, a data identifier of the person;
retrieving, from an inmate database based on the data identifier of the person, a release date of the person from a detention facility;
processing the received facial image to identify at least one facial landmark therein;
retrieving a first set of person identifying data based on the identified facial landmarks and a second set of person identifying data based on the data identifier of the person;
when the first and second sets of person identifying data do not match, outputting an indicator of a failed release identity verification due to a failed match, the failed release identity verification indicating that the person is not to be released from the detention facility; and
when the first and second sets of person identifying data match, outputting an indicator of a match and a successful release identity verification indicating that the person is to be released from the detention facility.

16. The computing device of claim 15, further comprising:
a radio frequency identifier (RFID) tag reader to read RFID tags worn or otherwise in possession of the person;
wherein the data identifier of the person is a data item read by the RFID tag reader from an RFID tag.

17. The computing device of claim 15, wherein the first and second sets of person identifying data are retrieved from a database stored locally to the computing device within the memory.

18. The computing device of claim 15, the data processing activities further comprising:
   verifying a release date of the person is equal to or earlier than a current date; and
   verifying an operator of the computing device is authorized to release the person.

19. The computing device of claim 15, wherein the data processing activities performed to provide a successful release identity verification further include:
   retrieving data of the person from at least one external database for any outstanding warrants or other detainer requests, the retrieving performed based on one or more of facial image data, stored biometric data of the person, and other personally identifying data of the person.

20. The computing device of claim 15, wherein at least some of the data processing activities are performed through calls over a network via a network interface device of the computing device.

\* \* \* \* \*